(12) United States Patent
Desai et al.

(10) Patent No.: US 9,031,604 B2
(45) Date of Patent: May 12, 2015

(54) METHOD AND APPARATUS FOR ENABLING SIMULTANEOUS VOWLAN AND BLUETOOTH AUDIO IN SMALL FORM FACTOR HANDHELD DEVICES

(75) Inventors: Prasanna Desai, Olivenhain, CA (US); Shawn Stevenson, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1439 days.

(21) Appl. No.: 11/387,895

(22) Filed: Mar. 23, 2006

(65) Prior Publication Data
US 2007/0223430 A1    Sep. 27, 2007

(51) Int. Cl.
| H04M 1/00 | (2006.01) |
| H04L 1/18 | (2006.01) |
| H04L 1/00 | (2006.01) |
| H04W 28/04 | (2009.01) |
| H04W 84/18 | (2009.01) |
| H04W 88/06 | (2009.01) |

(52) U.S. Cl.
CPC ............. *H04L 1/1854* (2013.01); *H04L 1/0006* (2013.01); *H04W 28/04* (2013.01); *H04W 84/18* (2013.01); *H04W 88/06* (2013.01)

(58) Field of Classification Search
USPC ................ 455/41.1, 41.2, 63.1, 67.11, 552.1, 455/553.1, 500, 501, 512, 66.1, 522
See application file for complete search history.

(56) References Cited

U.S. PATENT DOCUMENTS

| 7,046,649 B2 * | 5/2006 | Awater et al. ................. 370/338 |
| 7,058,431 B2 * | 6/2006 | Sasaki ............................ 455/574 |
| 7,454,171 B2 * | 11/2008 | Palin et al. ................... 455/41.2 |
| 7,924,866 B2 * | 4/2011 | Tong et al. ..................... 370/437 |
| 2003/0003905 A1 * | 1/2003 | Shvodian ....................... 455/423 |
| 2006/0039329 A1 * | 2/2006 | Samuel et al. ................ 370/335 |

OTHER PUBLICATIONS

Draft Recommended Practice for Information Technology—Telecommunications and Information Exchange Between Systems—Local and Metropolitan Area Networks Specific Requirements—Part 15.2: Coexistence of Wireless Personal Area Networks with Other Wireless Devices Operating in Unlicensed Frequency Bands, IEEE P802.15.2/Draft #05, Mar. 15, 2002, pp. i-98, copyright by the Institute of Electrical and Electronics Engineers, Inc., New York, US.

(Continued)

*Primary Examiner* — Ping Hsieh
(74) *Attorney, Agent, or Firm* — McDermott Will & Emery LLP

(57) ABSTRACT

Certain aspects of a method and system for providing wireless communication may include a single integrated circuit (IC) that handles communication for at least a Bluetooth (BT) connection and a Wireless Local Area Network (WLAN) connection by controlling transmission of acknowledgement signals based on a measured voice quality for one or both of the BT connection and the WLAN connection. The transmission of the acknowledgement signals communicated from the mobile station to an access point may be controlled. A BT priority signal may be asserted if data to be transmitted comprises high quality voice (HV3) data. The transmission of the acknowledgement signals may be controlled by raising a priority of an asserted WLAN priority signal higher than a priority of the asserted BT priority signal. The voice data may be transmitted via high quality voice (HV3) frames over the BT connection based on the asserted WLAN priority signal.

30 Claims, 10 Drawing Sheets

(56) References Cited

OTHER PUBLICATIONS

Crow, Widjaja, Kim and Sakai, IEEE 802.11 Wireless Local Area Networks, IEEE Communications Magazine, Sep. 1997, pp. 116-126.

Golmie, Chevrollier and Rebala, Bluetooth and WLAN Coexistence: Challenges and Solutions, IEEE Wireless Communications, Dec. 2003, pp. 22-29.

* cited by examiner

METHOD AND APPARATUS FOR ENABLING SIMULTANEOUS VOWLAN AND BLUETOOTH AUDIO IN SMALL FORM FACTOR HANDHELD DEVICES

CROSS-REFERENCE TO RELATED APPLICATIONS/INCORPORATION BY REFERENCE

This application makes reference to:
U.S. application Ser. No. 11/143,559 filed Jun. 2, 2005;
U.S. application Ser. No. 11/143,378 filed Jun. 2, 2005;
U.S. application Ser. No. 11/387,340 filed Mar. 23, 2006; and
U.S. application Ser. No. 11/387,309 filed Mar. 23, 2006.

Each of the above referenced applications are hereby incorporated herein by reference in its entirety.

FIELD OF THE INVENTION

Certain embodiments of the invention relate to communication systems. More specifically, certain embodiments of the invention relate to a method and apparatus for enabling simultaneous VoWLAN and Bluetooth audio in small form factor handheld devices.

BACKGROUND OF THE INVENTION

The use of Wireless Personal Area Networks (WPANs) has been gaining popularity in a great number of applications because of the flexibility and convenience in connectivity they provide. WPAN systems, such as those based on Class 2 Bluetooth (BT) technology, generally replace cumbersome cabling and/or wiring used to connect peripheral devices and/or mobile terminals by providing short distance wireless links that allow connectivity within a 10-meter range. Though, for a limited number of applications, higher-powered Class 1 BT devices may operate within a 100-meter range, for example. In contrast to Class 2 WPAN systems, Wireless Local Area Networks (WLANs) provide connectivity to devices that are located within a slightly larger geographical area, such as the area covered by a building or a campus, for example. WLAN systems are based on IEEE 802.11 standard specifications, typically operate within a 100-meter range, and are generally utilized to supplement the communication capacity provided by traditional wired Local Area Networks (LANs) installed in the same geographic area as the WLAN system.

In some instances, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Both Bluetooth and WLAN radio devices, such as those used in, for example, handheld wireless terminals, generally operate in the 2.4 GHz (2.4000-2.4835 GHz) Industrial, Scientific, and Medical (ISM) unlicensed band. Other radio devices, such as those used in cordless phones, may also operate in the ISM unlicensed band. While the ISM band provides a suitable low-cost solution for many of short-range wireless applications, it may also have some drawbacks when multiple users operate simultaneously. For example, because of the limited bandwidth, spectrum sharing may be necessary to accommodate multiple users. Multiple active users may also result in significant interference between operating devices. Moreover, in some instances, microwave ovens may also operate in this frequency spectrum and may produce significant interference or blocking signals that may affect Bluetooth and/or WLAN transmissions.

When operating a Bluetooth radio and a WLAN radio in, for example, a wireless device, at least two different types of interference effects may occur. First, when an interfering signal is present in a transmission medium along with the signal-of-interest, a low signal-to-noise-plus-interference ratio (SINR) may result. In this instance, for example, a Bluetooth signal may interfere with a WLAN signal or a WLAN signal may interfere with a Bluetooth signal. The second effect may occur when the Bluetooth and WLAN radio devices are collocated, that is, when they are located in close proximity to each other so that there is a small radio frequency (RF) path loss between their corresponding radio front-end receivers. In this instance, the isolation between the Bluetooth radio front-end and the WLAN radio front-end may be as low as 10 dB, for example. As a result, one radio may desensitize the front-end of the other radio upon transmission. Moreover, since Bluetooth employs transmit power control, the collocated Bluetooth radio may step up its power level when the signal-to-noise ratio (SNR) on the Bluetooth link is low, effectively compromising the front-end isolation between radio devices even further. Low noise amplifiers (LNAs) in the radio front-ends may not be preceded by a channel selection filter and may be easily saturated by the signals in the ISM band, such as those from collocated transmissions. The saturation may result in a reduction in sensitivity or desensitization of the receiver portion of a radio front-end, which may reduce the radio front-end's ability to detect and demodulate the desired signal.

Packet communication in WLAN systems requires acknowledgement from the receiver in order for the communication to proceed. When the isolation between collocated radio devices is low, collisions between WLAN communication and Bluetooth communication, due to greater levels of mutual interference than if the isolation were high, may result in a slowdown of the WLAN communication, as the access point does not acknowledge packets. This condition may continue to spiral downwards until the access point drops the WLAN station. If, in order to avoid this condition, WLAN communication in collocated radio devices is given priority over all Bluetooth communication, then isochronous Bluetooth packet traffic, which does not have retransmission capabilities, may be starved of communication bandwidth. Moreover, this approach may also starve other Bluetooth packet traffic of any communication access. Collocated WLAN/Bluetooth radio devices should therefore be operated so as to maintain WLAN communication rates high while also providing access to Bluetooth communication when necessary.

Different techniques have been developed to address the low isolation problem that occurs between collocated Bluetooth and WLAN radio devices in coexistent operation. These techniques may take advantage of either frequency and/or time orthogonality mechanisms to reduce interference between collocated radio devices. Moreover, these techniques may result from so-called collaborative or non-collaborative mechanisms in Bluetooth and WLAN radio devices, where collaboration refers to any direct communication between the protocols. For example, Bluetooth technology utilizes Adaptive Frequency Hopping (AFH) as a frequency division multiplexing (FDM) technique that minimizes channel interference. In AFH, the physical channel is characterized by a pseudo-random hopping, at a rate of 1600 hops-per-second, between 79.1 MHz channels in the Bluetooth piconet. AFH provides a non-collaborative mechanism that may be utilized by a Bluetooth device to avoid frequencies occupied by a spread spectrum system such as a WLAN system. In some instances, the Bluetooth radio may be adapted to modify its hopping pattern based on, for example, frequencies in the ISM spectrum that are not being occupied by other users.

Even when frequency division multiplexing techniques are applied, significant interference may still occur because a strong signal in a separate channel may still act as a blocking signal and may desensitize the radio front-end receiver, that is, increase the receiver's noise floor to the point that the received signal may not be clearly detected. For example, a collocated WLAN radio front-end transmitter generating a 15 dBm signal acts as a strong interferer or blocker to a collocated Bluetooth radio device receiver when the isolation between radio devices is only 10 dB. Similarly, when a Bluetooth radio device is transmitting and a WLAN radio device is receiving, particularly when the Bluetooth radio front-end transmitter is operating as a 20 dBm Class 1 type, the WLAN radio device receiver may be desensitized by the Bluetooth transmission as the isolation between radios is reduced.

Other techniques may be based on collaborative coexistence mechanisms, such as those described in the IEEE 802.15.2-2003 Recommended Practice for Information Technology—Part 15.2: Coexistence of Wireless Personal Area Networks with Other Wireless Devices Operating in the Unlicensed Frequency Bands. For example, these techniques may comprise Medium Access Control (MAC) layer mechanisms or Physical (PHY) layer mechanisms. The MAC layer techniques may comprise, for example, the Alternating Wireless Medium Access (AWMA) technique or the Packet Traffic Arbitration (PTA) technique. Both the AWMA and the PTA techniques provide a time division multiplexing (TDM) approach to the collocated radio device isolation problem. For example, the AWMA technique partitions a WLAN communication interval into two segments: one for the WLAN system and one for the WPAN system. Each wireless system is then restricted to transmissions in their allocated time segments. On the other hand, the PTA technique provides for each communication attempt by either a collocated WLAN radio device or a Bluetooth radio device to be submitted for arbitration and approval. The PTA may then deny a communication request that would result in collision or interference. The PHY layer technique may comprise, for example, a programmable notch filter in the WLAN radio device receiver to filter out narrow-band WPAN or Bluetooth interfering signals. These techniques may result in some transmission inefficiencies or in the need of additional hardware features in order to achieve better coexistent operation.

Other collaborative coexistence mechanisms may be based on proprietary technologies. For example, in some instances, firmware in the collocated WLAN radio device may be utilized to poll a status signal in the collocated Bluetooth radio device to determine whether Bluetooth communication is to occur. However, polling the Bluetooth radio device may have to be performed on a fairly constant basis and may detract the WLAN radio device from its own WLAN communication operations. If a polling window is utilized instead, where the polling window may be as long as several hundred microseconds, the WLAN radio device may have adequate time available to poll the BT radio device, which may indicate that BT communication is to occur. In other instances, the collocated WLAN and Bluetooth radio devices may utilize an interrupt-driven arbitration approach. In this regard, considerable processing time may be necessary for handling the interrupt operation and to determine the appropriate communication schedule based on the priority and type of WLAN and Bluetooth packets.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for enabling simultaneous VoWLAN and Bluetooth audio in small form factor handheld devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for providing wireless communication may comprise a single integrated circuit (IC) that handles communication for at least a Bluetooth (BT) connection and a Wireless Local Area Network (WLAN) connection by controlling transmission of acknowledgement signals based on a measured voice quality of one or both of the BT connection and the WLAN connection. The transmission of the acknowledgement signals communicated from the mobile station to an access point may be controlled. A BT priority signal may be asserted if data to be transmitted comprises high quality voice (HV3) data. The transmission of the acknowledgement signals may be controlled by raising a priority of an asserted WLAN priority signal higher than a priority of the asserted BT priority signal. The voice data may be transmitted via high quality voice (HV3) frames over the BT connection based on the asserted WLAN priority signal.

Figure 1A:
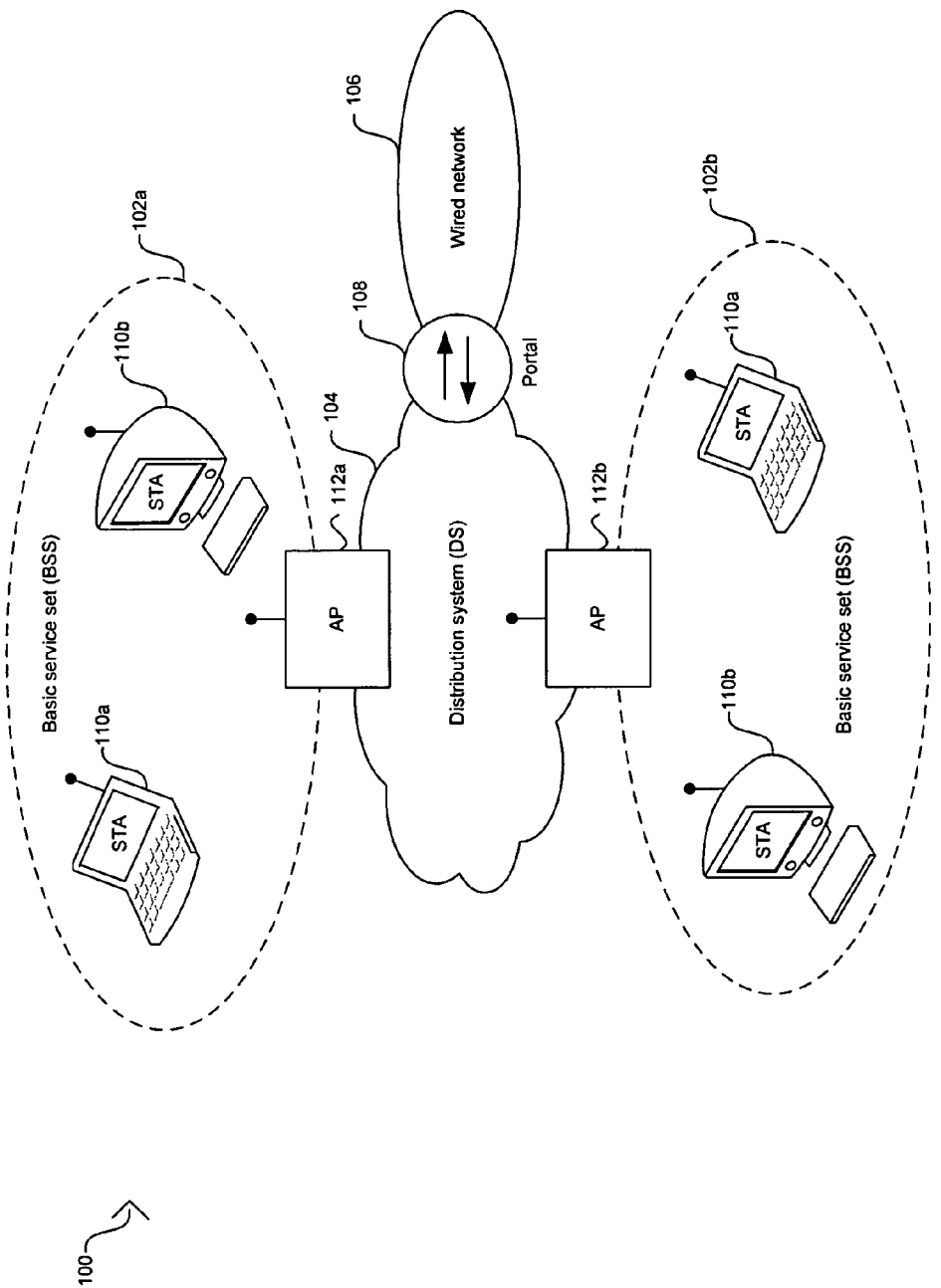
FIG. 1A is a block diagram of an exemplary WLAN infrastructure network comprising basic service sets (BSSs) integrated using a common distribution system (DS), in connection with an embodiment of the invention.

FIG. 1A is a block diagram of an exemplary WLAN infrastructure network comprising basic service sets (BSSs) integrated using a common distribution system (DS), in connection with an embodiment of the invention. Referring to FIG. 1A, the exemplary WLAN infrastructure network 100 shown may comprise a first BSS 102a, a second BSS 102b, a DS 104, a wired network 106, a portal 108, a first access point (AP) 112a, a second AP 102b, and a plurality of WLAN stations (STAs). The BSSs 102a and 102b may represent a fundamental building block of the IEEE 802.11 (WLAN) architecture and may be defined as a group of stations (STAs) that are under the direct control of a single coordination function. The geographical area covered by a BSS is known as the basic service area (BSA). The DS 104 may be utilized to integrate the BSSs 102a and 102b and may comprise suitable hardware, logic, circuitry, and/or code that may be adapted to operate as a backbone network that is responsible for Medium Access Control (MAC) level transport in the WLAN infrastructure network 100. The DS 104, as specified by the IEEE 802.11 standard, is implementation independent. For example, the DS 104 may be implemented utilizing IEEE 802.3 Ethernet Local Area Network (LAN), IEEE 802.4 token bus LAN, IEEE 802.5 token ring LAN, Fiber Distributed Data Interface (FDDI) Metropolitan Area Network (MAN), or another IEEE 802.11 wireless medium. The DS 104 may be implemented utilizing the same physical medium as either the first BSS 102a or the second BSS 102b. However, the DS 104 is logically different from the BSSs and may be utilized only to transfer packets between the BSSs and/or to transfer packets between the BSSs and the wired network 106.

The wired network 106 may comprise suitable hardware, logic, circuitry, and/or code that may be adapted to provide wired networking operations. The wired network 106 may be accessed from the WLAN infrastructure network 100 via the portal 108. The portal 108 may comprise suitable hardware, logic, circuitry, and/or code and may be adapted to integrate the WLAN infrastructure network 100 with non-IEEE 802.11 networks. Moreover, the portal 108 may also be adapted to perform the functional operations of a bridge, such as range extension and/or translation between different frame formats, in order to integrate the WLAN infrastructure network 100 with IEEE 802.11-based networks.

The APs 112a and 112b may comprise suitable hardware, logic, circuitry, and/or code that may be adapted to support range extension of the WLAN infrastructure network 100 by providing the integration points necessary for network connectivity between the BSSs. The STA 110a and the STA 110b correspond to WLAN-enabled terminals that comprise suitable hardware, logic, circuitry, and/or code that may be adapted to provide connectivity to the WLAN infrastructure network 100 via the APs. The STA 110a shown is a laptop computer and may correspond to a mobile station or terminal within the BSS and the STA 110b shown is a desktop computer and may correspond to a fixed or stationary terminal within the BSS. Each BSS may comprise a plurality of mobile or fixed stations and may not be limited to the exemplary implementation shown in FIG. 1A.

Figure 1B:
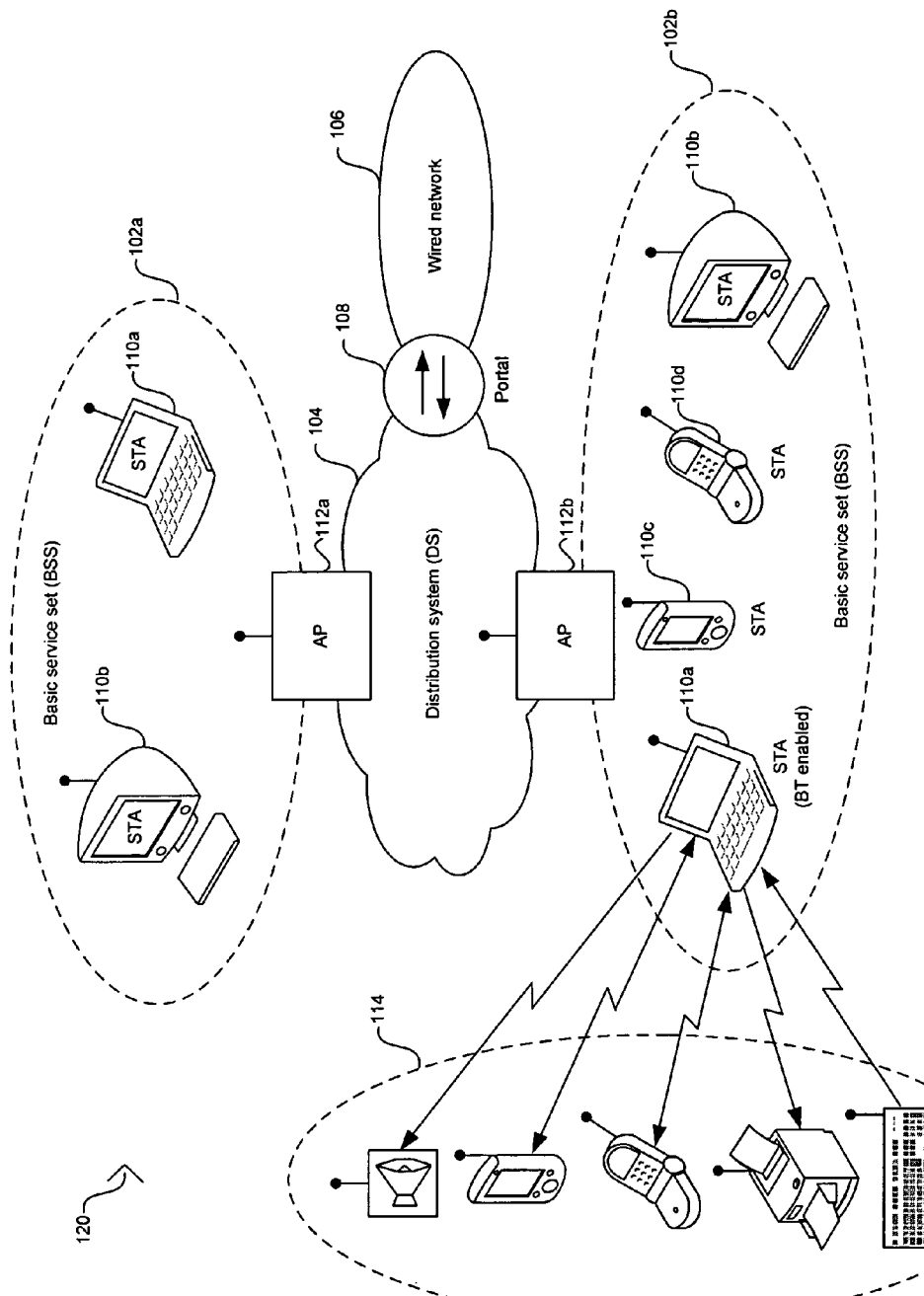
FIG. 1B is a block diagram of an exemplary WLAN infrastructure network comprising a basic service set (BSS) with stations that support WLAN/Bluetooth coexistence, in accordance with an embodiment of the invention.

FIG. 1B is a block diagram of an exemplary WLAN infrastructure network comprising a basic service set (BSS) with stations that support WLAN/Bluetooth coexistence, in accordance with an embodiment of the invention. Referring to FIG. 1B, the exemplary WLAN infrastructure network 120 shown differs from the WLAN infrastructure network 100 in FIG. 1A in that at least one BSS comprises at least one station or terminal that supports Bluetooth technology. In this regard, the second BSS 102b comprises additional mobile terminals or stations such as a Personal Digital Assistant (PDA) 110c and a mobile phone 110d while the laptop computer 110a is now shown to be Bluetooth-enabled. The peripheral devices 114 shown may be part of the Wireless Personal Area Network (WPAN) supported by the Bluetooth-enabled laptop computer. For example, the laptop computer 110a may communicate via Bluetooth technology with a keyboard, a mouse, a printer, a mobile phone, a PDA, and/or a set of headphones or speakers, where these devices and the laptop computer 110a may form an ad-hoc Bluetooth piconet. Generally, a Bluetooth piconet may comprise a master device or terminal and up to seven slave devices or terminals. In this exemplary implementation, the laptop computer 110a may correspond to the master Bluetooth terminal and the peripheral devices 114 may correspond to the slave Bluetooth terminals.

The Bluetooth-enabled laptop computer 110a in FIG. 1B may comprise a WLAN radio device and a Bluetooth radio device that allows it to communicate with the WLAN infrastructure network 100 via the AP 112b and with the Bluetooth piconet respectively. Because of the size of the laptop computer 110a, locating the WLAN and BT radio devices in the same terminal may result in signal interference between WLAN and BT communications. When the PDA 110c and/or the mobile phone 110d are Bluetooth-enabled, the small form factor of these coexistence terminals may result in a small radio frequency (RF) path loss between WLAN and BT radio devices and likely interference between WLAN and BT communications.

Figure 1C:
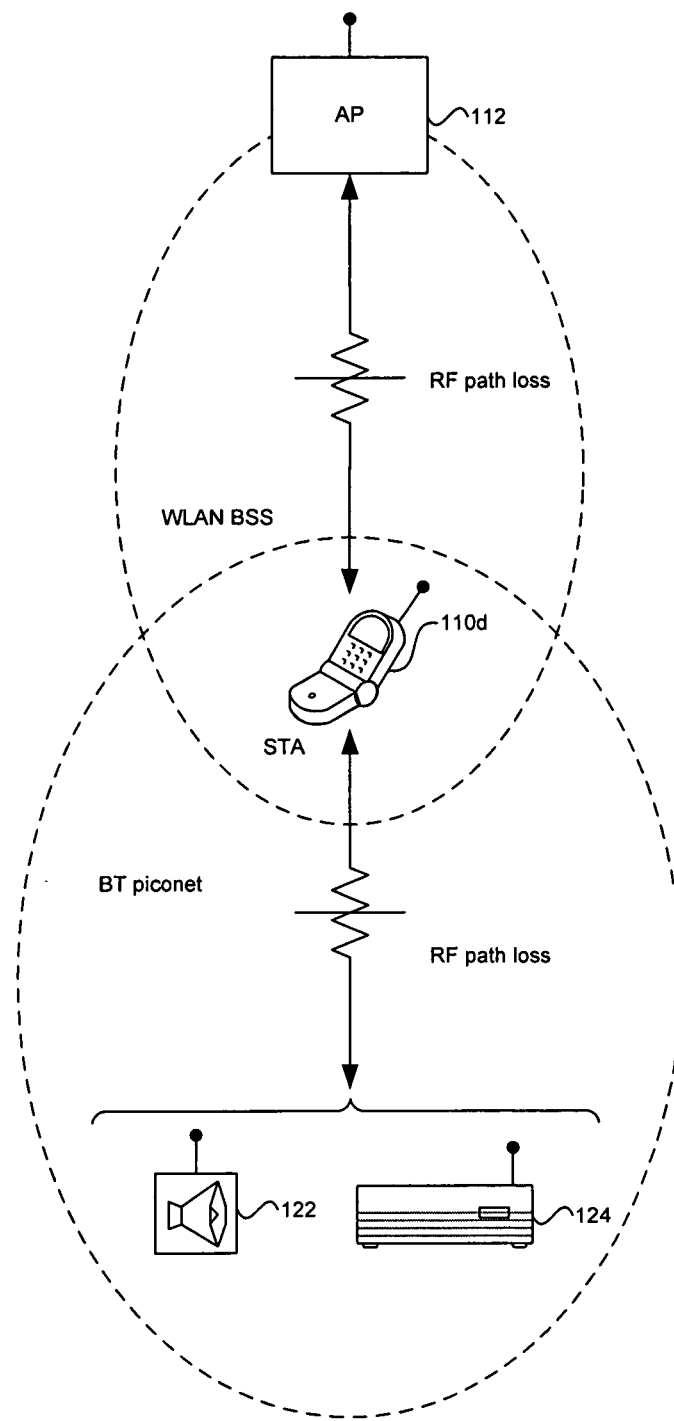
FIG. 1C is a block diagram that illustrates an exemplary usage model for a coexistence terminal with collocated WLAN and Bluetooth radio devices, in accordance with an embodiment of the invention.

FIG. 1C is a block diagram that illustrates an exemplary usage model for a coexistence terminal with collocated WLAN and Bluetooth radio devices, in accordance with an embodiment of the invention. Referring to FIG. 1C, the mobile phone 110d may comprise a WLAN radio device to communicate with the AP 112c. The mobile phone 110d may also be Bluetooth-enabled and may comprise a Bluetooth radio device to communicate with, for example, a Bluetooth headset 122 and/or a home gateway 124 with Bluetooth cordless telephony capability. Due to the small form factor of the mobile phone 110d, the WLAN and Bluetooth radio devices may be in such close proximity to each other within the same coexistence terminal that the isolation between them is sufficiently low to allow desensitization of one radio device by the other's transmissions.

The Bluetooth-enabled mobile phone 110d may comprise two maximum transmission power levels. For example, the mobile phone 110d may operate as a Class 1 power level terminal with a maximum transmission power of 20 dBm to communicate with the home gateway 124. In another example, the mobile phone 110d may operate as a Class 2 power level terminal with a maximum transmission power of 4 dBm to communicate with the Bluetooth headset 122. The Bluetooth headset 122 may comprise suitable hardware, logic, circuitry, and/or code that may be adapted to receive and/or transmit audio information. For example, the Bluetooth headset 122 may be adapted to receive and/or transmit Continuous Variable Slope Delta (CVSD) modulated voice from the mobile phone 110d or receive A2DP, such as MP3, from the mobile phone 110d. The home gateway 124 may comprise suitable hardware, logic, circuitry, and/or code that may be adapted to receive and/or transmit data and/or audio information. For example, the home gateway 124 may receive and/or transmit 64 kb/s CVSD modulated voice.

In operation, the mobile phone 110d may receive voice or audio content from the WLAN infrastructure network via the AP 112c and may communicate the voice or audio contents to the Bluetooth headset 122 or the voice contents to the home gateway 124. Similarly, the Bluetooth headset 122 the home gateway 124 may communicate voice contents to the Bluetooth-enabled mobile phone 110d which in turn may communicate the voice contents to other users through the WLAN infrastructure network.

Figure 1D:
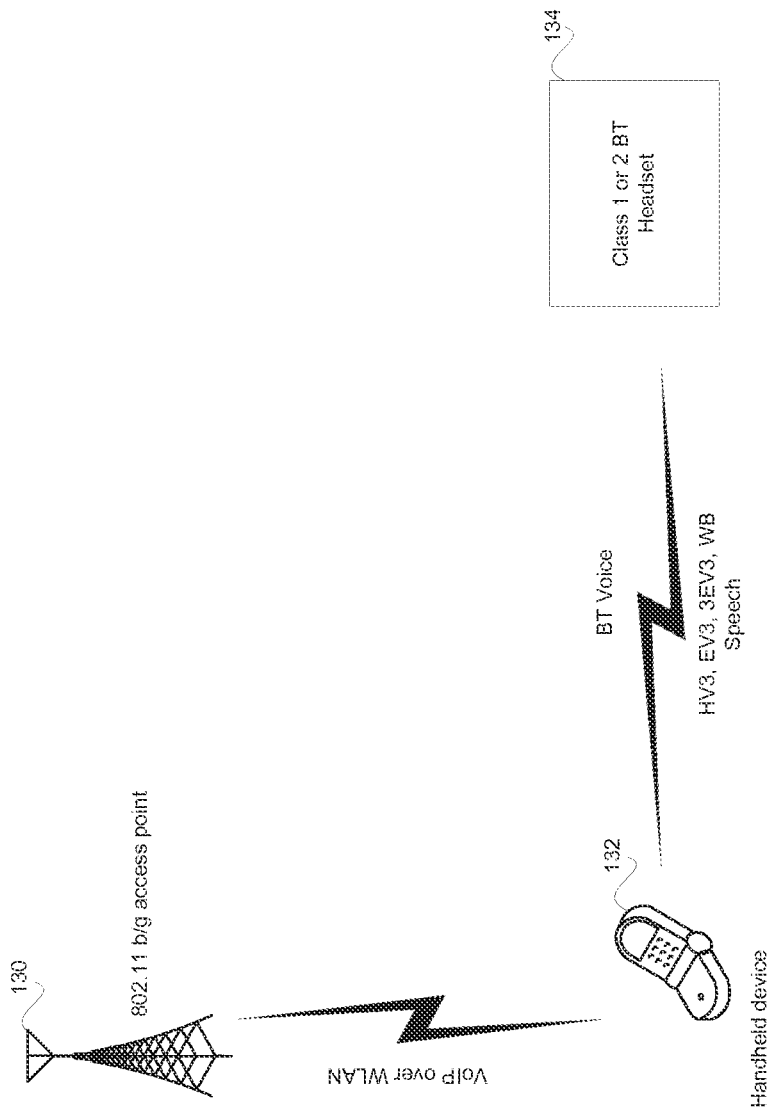
FIG. 1D is a block diagram that illustrates another embodiment of an exemplary usage model for a coexistence terminal with collocated WLAN and Bluetooth radio devices, in accordance with an embodiment of the invention.

FIG. 1D is a block diagram that illustrates another embodiment of an exemplary usage model for a coexistence terminal with collocated WLAN and Bluetooth radio devices, in accordance with an embodiment of the invention. Referring to FIG. 1D, there is shown an access point (AP) 130, a handheld device, for example, a mobile phone 132 and a Bluetooth headset 134.

The AP 130 may comprise suitable hardware, logic, circuitry, and/or code that may be adapted to support range extension of the WLAN infrastructure network by providing the integration points necessary for network connectivity between the base stations. The mobile phone 132 may comprise a WLAN radio device to communicate with the AP 130. The mobile phone 132 may also be Bluetooth-enabled and may comprise a Bluetooth radio device to communicate with, for example, the Bluetooth headset 134. The Bluetooth headset 134 may comprise suitable hardware, logic, circuitry, and/or code that may be adapted to receive and/or transmit audio information.

The mobile phone 132 may be coupled to the AP 130 via an 802.11 based (WLAN) wireless connection. The mobile phone 132 may be coupled to the Bluetooth headset 134 via a Bluetooth (BT) connection between the mobile phone 132 and the BT headset 134. The WLAN may be adapted to carry voice traffic that may be packetized into frames of 5 to 30 ms of voice, for example. These packetized frames may be encapsulated into standard real-time transport protocol (RTP) packets. The data packets may be transmitted over a network and reassembled to create a synchronous voice stream. The BT interface may be adapted to carry voice traffic with packetized frames, but the data may be processed as a synchronous pulse coded modulated (PCM) stream by the voice processor.

The mobile phone 132 may comprise suitable hardware, logic, circuitry, and/or code that may be adapted to interface the voice processor and the Bluetooth controller. Command and control data may be passed through a serial interface known as a host controller interface (HCI). The HCI is, for example, a USB or UART interface. Voice data may be communicated either through a PCM interface or through the HCI. The PCM interface may include passing voice samples using four pins, for example, a clock pin, a frame synchronization pin, an input data pin and an output data pin. The voice data may be sampled at 8 kHz at 12 to 16 bits per sample, for example. Each sample may be clocked in/out on the PCM interface one bit at a time once every 125 microseconds, for example. In a two-wire coexistence interface, one wire may be an output from the BT controller and the other may be an input. These wires may indicate when each radio is transmitting.

U.S. application Ser. No. 11/143,559 filed Jun. 2, 2005 and U.S. application Ser. No. 11/143,378 filed Jun. 2, 2005, provide a detailed description of a two-wire coexistence interface, and are hereby incorporated by reference in their entirety.

When a user speaks into the BT headset 134 to a remote party, the voice may be sampled by the BT headset 134, converted into mu-law, A-law or CVSD format. After conversion, the voice samples may be packetized into HV3 packets, and transmitted to the mobile phone 132. The BT radio in the mobile phone 134 may be adapted to receive the packetized HV3 packets, which may be processed by the BT controller. The BT controller may be adapted to convert the voice back into uniform samples and transmit the samples to the voice processor using the HCI or PCM interface. The voice processor may be adapted to collect the samples into memory and encode the samples once every frame period, for example. The length of the frame period may depend on the type of voice compression, for example, 5 to 30 ms. After the voice compression, the samples may be packetized into RTP packets and transmitted to the WLAN processor over a serial interface, for example. The voice data may be transmitted to the AP 130. The AP 130 may be adapted to route the voice data to its destination device, which may be another wired or wireless IP phone, or a VoIP to PSTN gateway.

When a remote party is talking to a listener on the BT headset 134, the RTP packets may be transmitted from the AP 130 to the mobile phone 132. The WLAN processor in the mobile phone 132 may be adapted to receive the RTP packets from the AP 130. The received RTP packets may be processed by the voice processor in the mobile phone 132. The received packets may be buffered and de-jittered, and the voice data may be de-compressed. The voice may be converted to uniform samples, which may be passed via the PCM or HCI interface at 8 kHz, for example, to the BT processor. The BT processor may enable encoding of the voice samples from mu-law, A-law or CVSD into voice data. The voice data may be packetized and transmitted as HV3 packets to the BT headset 134. The BT headset 134 may be adapted to receive the packets, convert the voice to uniform samples and play them out the speaker.

The mobile phone 132 may comprise suitable logic and/or code that may be adapted to communicate with the BT controller. At the lowest level, software may be utilized to control the UART and control lines such as the reset line to the BT controller and power control lines. Software may be utilized to communicate with the BT controller by allowing BT profiles to be implemented such as the headset profile. The BT controller may be adapted to communicate with the lower level software through abstraction layers such as the operating system (OS) independent kernel interface, for example. Application code may be utilized to control the headset provided by the headset profile.

In an embodiment of the invention, the application code may be adapted to translate commands from the user interface into application program interface (API) calls to enable the headset profile, pair the headset, establish or break a synchronous connection oriented (SCO) connection to the headset, and to change the volume of the headset. The application code may be adapted to communicate back events from the BT controller, such as success or failure at setting up the SCO connection. In an embodiment of the invention, the voice processing software may be adapted to determine where to send and receive its voice samples based on whether or not the BT headset 134 is in use. For example, the samples may be routed to the PCM interface when BT headset 134 is in use, and to an internal audio block otherwise.

Figure 2:
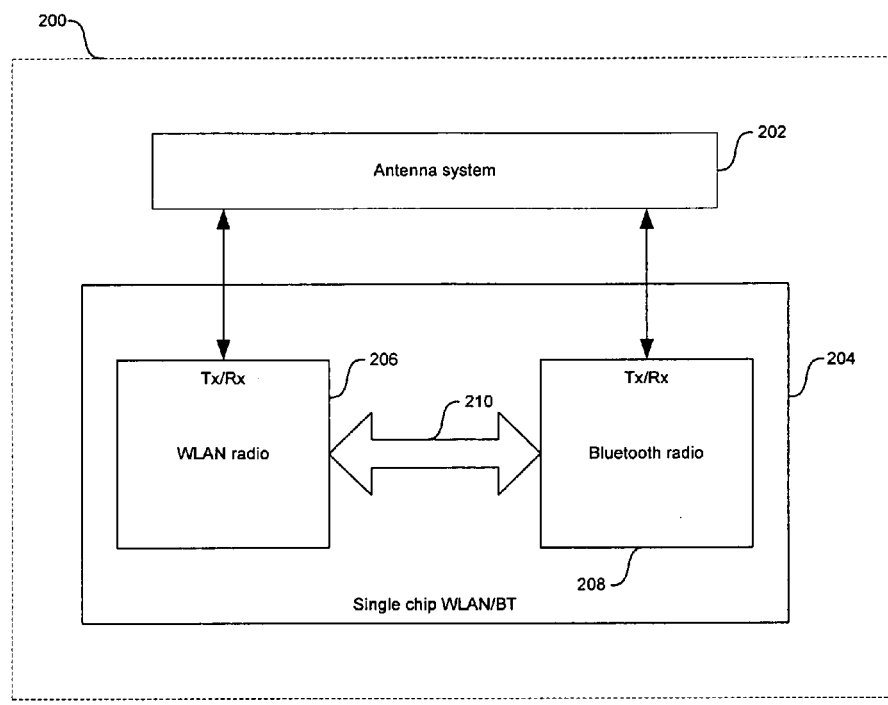
FIG. 2 is a block diagram that illustrates an exemplary single integrated circuit (IC) that supports WLAN and Bluetooth radio operations, in accordance with an embodiment of the invention.

FIG. 2 is a block diagram that illustrates an exemplary single radio chip that supports WLAN and Bluetooth radio operations, in accordance with an embodiment of the invention. Referring to FIG. 2, there is shown a mobile phone 200 that may comprise a WLAN/Bluetooth coexistence antenna system 202 and a single chip WLAN/Bluetooth (WLAN/BT) radio device 204. The single chip WLAN/BT radio device 204 may comprise a WLAN radio portion 206 and a Bluetooth radio portion 208. The single chip WLAN/BT radio device 204 may be implemented based on a system-on-chip (SOC) architecture, for example.

The WLAN/Bluetooth coexistence antenna system 202 may comprise suitable hardware, logic, and/or circuitry that may be adapted to provide WLAN and Bluetooth communication between external devices and a coexistence terminal. The WLAN/Bluetooth coexistence antenna system 202 may comprise at least one antenna for the transmission and reception of WLAN and Bluetooth packet traffic.

The WLAN radio portion 206 may comprise suitable logic, circuitry, and/or code that may be adapted to process WLAN protocol packets for communication. The WLAN radio portion 206 may be adapted to transfer and/or receive WLAN protocol packets and/or information to the WLAN/Bluetooth coexistence antenna system 202 via a single transmit/receive (Tx/Rx) port. In some instances, the transmit port (Tx) may be implemented separately from the receive port (Rx). The WLAN radio portion 206 may also be adapted to generate signals that control at least a portion of the operation of the WLAN/Bluetooth coexistence antenna system 202. Firmware operating in the WLAN radio portion 206 may be utilized to schedule and/or control WLAN packet communication, for example.

The WLAN radio portion 206 may also be adapted to receive and/or transmit priority signals 210. The priority signals 210 may be utilized to schedule and/or control the collaborative operation of the WLAN radio portion 206 and the Bluetooth radio portion 208. In this regard, the priority signals 210 may comprise a plurality of signals to implement various levels of transmission priority. For example, a single signal implementation may result in two transmission priority levels, a two-signal implementation may result in up to four different transmission priority levels, and a three-signal implementation may result in up to eight different transmission priority levels.

The Bluetooth radio portion 208 may comprise suitable logic, circuitry, and/or code that may be adapted to process Bluetooth protocol packets for communication. The Bluetooth radio portion 208 may be adapted to transfer and/or receive Bluetooth protocol packets and/or information to the WLAN/Bluetooth coexistence antenna system 202 via a single transmit/receive (Tx/Rx) port. In some instances, the transmit port (Tx) may be implemented separately from the receive port (Rx). The Bluetooth radio portion 208 may also be adapted to generate signals that control at least a portion of the operation of the WLAN/Bluetooth coexistence antenna system 202. Firmware operating in the Bluetooth radio portion 208 may be utilized to schedule and/or control Bluetooth packet communication. The Bluetooth radio portion 208 may also be adapted to receive and/or transmit priority signals 210. A portion of the operations supported by the WLAN radio portion 206 and a portion of the operations supported by the Bluetooth radio portion 208 may be performed by common logic, circuitry, and/or code.

In some instances, at least a portion of either the WLAN radio portion 206 or the Bluetooth radio portion 208 may be disabled and the wireless terminal may operate in a single-communication mode, that is, coexistence may be disabled. When at least a portion of the WLAN radio portion 206 is disabled, the WLAN/Bluetooth coexistence antenna system 202 may utilize a default configuration to support Bluetooth communication. When at least a portion of the Bluetooth radio portion 208 is disabled, the WLAN/Bluetooth coexistence antenna system 202 may utilize a default configuration to support WLAN communication.

Packet communication between the WLAN/Bluetooth coexistence antenna system 202 and the single chip WLAN/Bluetooth (WLAN/BT) radio device 204 may take place via a radio front-end topology in the single chip WLAN/Bluetooth (WLAN/BT) radio device 204. The radio front-end topology may be implemented partially in the WLAN radio portion 206 and/or partially in the Bluetooth radio portion 208, for example.

Figure 3A:
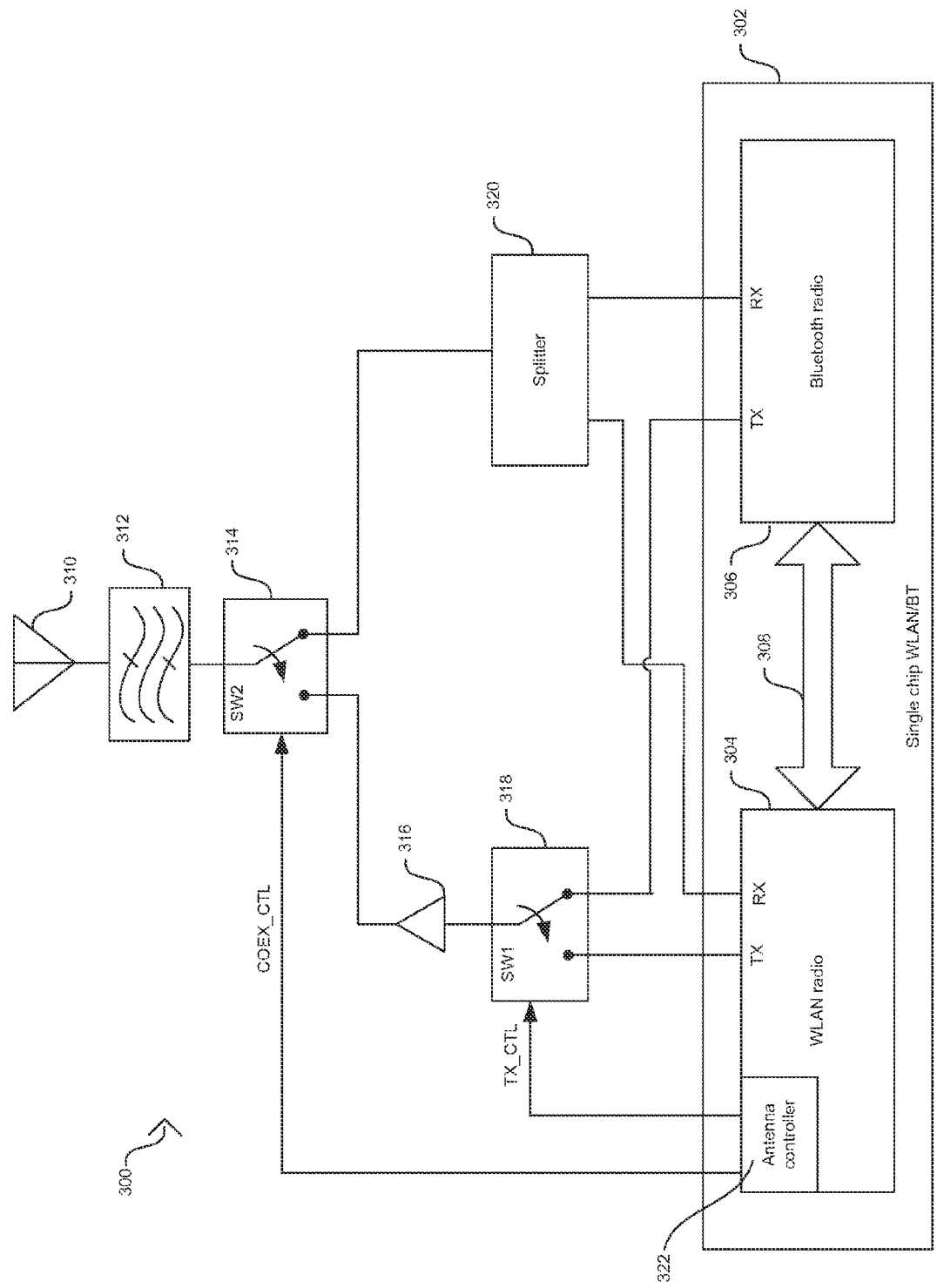
FIG. 3A is a block diagram illustrating an exemplary usage model for the single IC that supports WLAN and Bluetooth radio operations with one antenna, in accordance with an embodiment of the invention.

FIG. 3A is a block diagram illustrating an exemplary usage model for the single IC that supports WLAN and Bluetooth radio operations with one antenna, in accordance with an embodiment of the invention. Referring to FIG. 3A, the WLAN/Bluetooth collaborative radio architecture 300 may comprise a single antenna 310, a bandpass filter 312, a first antenna switch (SW1) 318, a second antenna switch (SW2) 314, a power amplifier (PA) 316, a splitter 320, and a single chip WLAN/Bluetooth (WLAN/BT) radio device 302. The single chip WLAN/BT radio device 302 may comprise a WLAN radio portion 304 and a Bluetooth radio portion 306. The WLAN radio portion 304 may comprise an antenna controller 322.

The single antenna 310 may comprise suitable logic, circuitry, and/or code that may be adapted to provide transmission and reception of Bluetooth and WLAN communication. In this regard, the single antenna 310 may be utilized for transmission and reception of a plurality of communication protocols. The bandpass filter 312 may comprise suitable hardware, logic, and/or circuitry that may be adapted to perform bandpass filtering on communication signals. The bandpass filter 312 may be implemented by utilizing a polyphase filter, for example. The bandpass filter 312 may be configured to conform to the bandpass requirements for the ISM band.

The SW1 318 and the SW2 314 may comprise suitable logic, circuitry, and/or code that may be adapted to select from signals at two input ports one that may be connected to an output port. The SW1 318 and SW2 314 may be implemented by utilizing, for example, single pull double throw (SPDT) switching devices or by utilizing a multiplexer (MUX), for example. The selection operation of the SW1 318 may be controlled by a control signal such as a WLAN transmission control (TX_CTL) signal generated by the antenna controller 322. The selection operation of the SW2 314 may be controlled by a control signal such as the coexistence control (COEX_CTL) signal generated by the antenna controller 322.

The WLAN radio portion 304 in the single chip WLAN/BT radio device 302 may comprise suitable logic, circuitry, and/or code that may be adapted to process WLAN protocol packets for communication. The antenna controller 322 in the WLAN radio portion 304 may comprise suitable logic, circuitry, and/or code that may be adapted to generate at least the TX_CTL and/or COEX_CTL control signals for configuring the station to receive and/or transmit WLAN and/or Bluetooth data. As shown, the WLAN radio portion 304 may comprise separate ports for transmission (Tx) and reception (Rx) of WLAN packet traffic. However, a single TX/RX port may also be utilized for WLAN communication. The WLAN radio portion 304 may be adapted to generate and/or receive at least one priority signal 308 for controlling and/or scheduling collaborative communication with the Bluetooth radio portion 306.

The Bluetooth radio portion 306 may comprise suitable logic, circuitry, and/or code that may be adapted to process Bluetooth protocol packets for communication. As shown, the Bluetooth radio portion 306 may comprise separate ports for transmission (Tx) and reception (Rx) of Bluetooth packet traffic. However, a single TX/RX port may also be utilized for Bluetooth communication. The Bluetooth radio portion 306 may be adapted to generate and/or receive at least one priority signal 308 for controlling and/or scheduling collaborative communication with the WLAN radio portion 304.

In some instances, either WLAN communication or Bluetooth communication may be disabled and the station may not operate in a coexistence mode. When the WLAN communication is disabled, the SW1 318 and/or the SW2 314 may utilize a default configuration to support Bluetooth communication. When the Bluetooth communication is disabled, the SW1 318 and/or the SW2 314 may utilize a default configuration to support WLAN communication.

The splitter 320 may comprise suitable hardware, logic, and/or circuitry that may be adapted to split a received communication data into a BT received data and a WLAN received data. The splitter 320 may be utilized to support separate Bluetooth reception and transmission paths and to reduce the need to arbitrate or schedule simultaneous Bluetooth and WLAN receptions. In some instances, another switch may be utilized to bypass the splitter 320 and reduce the implementation loss when operating in a WLAN-only or Bluetooth-only mode. The PA 316 may comprise suitable logic, circuitry, and/or code that may be adapted to amplify Bluetooth and/or WLAN transmission signals. The PA 316 may provide, for example, a 20 dB gain and may be implemented on-chip or off-chip. In this regard, the PA 316 may be utilized to provide class 1 operations for Bluetooth transmissions.

Figure 3B:
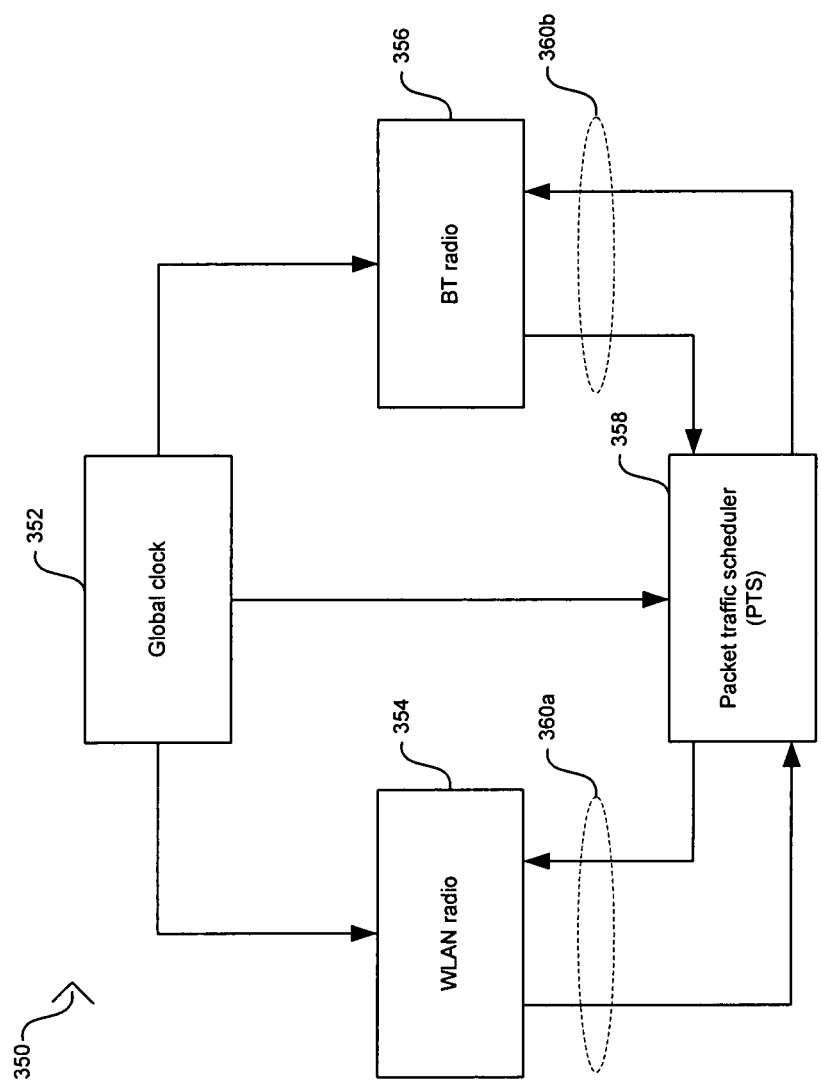
FIG. 3B is a block diagram that illustrates an exemplary implementation of a packet traffic scheduler (PTS) in a single radio chip that supports WLAN and Bluetooth radio operations, in accordance with an embodiment of the invention.

FIG. 3B is a block diagram that illustrates an exemplary implementation of a packet traffic scheduler (PTS) in a single radio chip that supports WLAN and Bluetooth radio operations, in accordance with an embodiment of the invention. Referring to FIG. 3B, there is shown a single chip WLAN/BT radio device 350 that may comprise a global clock 352, WLAN radio portion 354, a Bluetooth radio portion 356, and a packet traffic scheduler (PTS) 358. The global clock may be chosen to be the BT clock.

The WLAN radio portion 354 may comprise suitable logic, circuitry, and/or code that may be adapted to process WLAN protocol packets for communication. In this regard, the WLAN radio portion 304 may be substantially as the WLAN radio portion 206 described in FIG. 2. The WLAN radio portion 354 may be adapted to communicate with the PTS 358 via control and/or data signals 360a. A portion of the control and/or data signals 360a may comprise WLAN transmission priority level information. The control and/or data signals 360a may comprise information of a current WLAN transmission priority level. The control and/or data signals 360a may comprise information as to future WLAN transmission requirements by the WLAN radio portion 354. The control and/or data signals 360a may also comprise information to reduce or increase the WLAN transmission priority level in the WLAN radio portion 354. The PTS 358 may modify the WLAN transmission priority level via the control and/or data signals 360a based, at least in part, on Bluetooth transmission priority level information received by the PTS 358 from the Bluetooth radio portion 356. The PTS 358 may also be adapted to modify the WLAN transmission priority level base in, for example, the type of packets that are being communicated.

The Bluetooth radio portion 356 may comprise suitable logic, circuitry, and/or code that may be adapted to process Bluetooth protocol packets for communication. In this regard, the Bluetooth radio portion 356 may be substantially similar to the Bluetooth radio portion 208 described in FIG. 2. The Bluetooth radio portion 356 may be adapted to communicate with the PTS 358 via control and/or data signals 360b. A portion of the control and/or data signals 360b may comprise Bluetooth transmission priority level information. The control and/or data signals 360b may comprise information related to a current Bluetooth transmission priority level. The control and/or data signals 360b may comprise information related to future Bluetooth transmission requirements by the Bluetooth radio portion 356. The control and/or data signals 360b may also comprise information to reduce or increase the Bluetooth transmission priority level in the Bluetooth radio portion 356. The PTS 358 may modify the Bluetooth transmission priority level via the control and/or data signals 360b based, at least in part, on WLAN transmission priority level information received by the PTS 358 from the WLAN radio portion 354.

In accordance with various embodiments of the invention, various portions of the operations supported by the WLAN radio portion 354 and various portions of the operations supported by the Bluetooth radio portion 356 may be performed by common logic, circuitry, and/or code. Exemplary common logic, circuitry, and/or code may comprise front-end radio receivers, packet processing blocks, packet scheduling blocks, and/or priority level processing, for example. This approach may be utilized to, for example, reduce power consumption and/or reduce the die size of the single chip WLAN/BT radio device 350.

The PTS 358 may comprise suitable logic, circuitry, and/or code that may be adapted to schedule WLAN transmissions and/or Bluetooth transmissions based on WLAN transmission priority level information, Bluetooth transmission priority level information, future WLAN transmission requirements, and/or future Bluetooth transmission requirements. In this regard, the PTS 358 need not be limited to per-packet arbitration and/or authorization of current WLAN or Bluetooth transmission needs. The PTS 358 may be adapted to generate signals that may modify the Bluetooth transmission priority level in the Bluetooth radio portion 356 and/or modify the WLAN transmission priority level in the WLAN radio portion 304. The PTS 358 may be implemented separately from the WLAN radio portion 354 or the Bluetooth radio portion 356. In other implementations, at least portions of the PTS 358 may be implemented in the WLAN radio portion 354 and/or the Bluetooth radio portion 356.

The global clock 352 may comprise suitable logic, circuitry, and/or code that may be adapted to generate a single clock source for the WLAN radio portion 354, the Bluetooth radio portion 356, and/or the PTS 358. The use of the global clock 352 may allow the PTS 358 to coordinate, schedule, and/or synchronize current and/or future WLAN and Bluetooth transmissions with improved timing accuracy than if separate clocks were utilized for WLAN and Bluetooth transmissions. The global clock 352 may be based on the Bluetooth clock, for example.

Figure 4A:
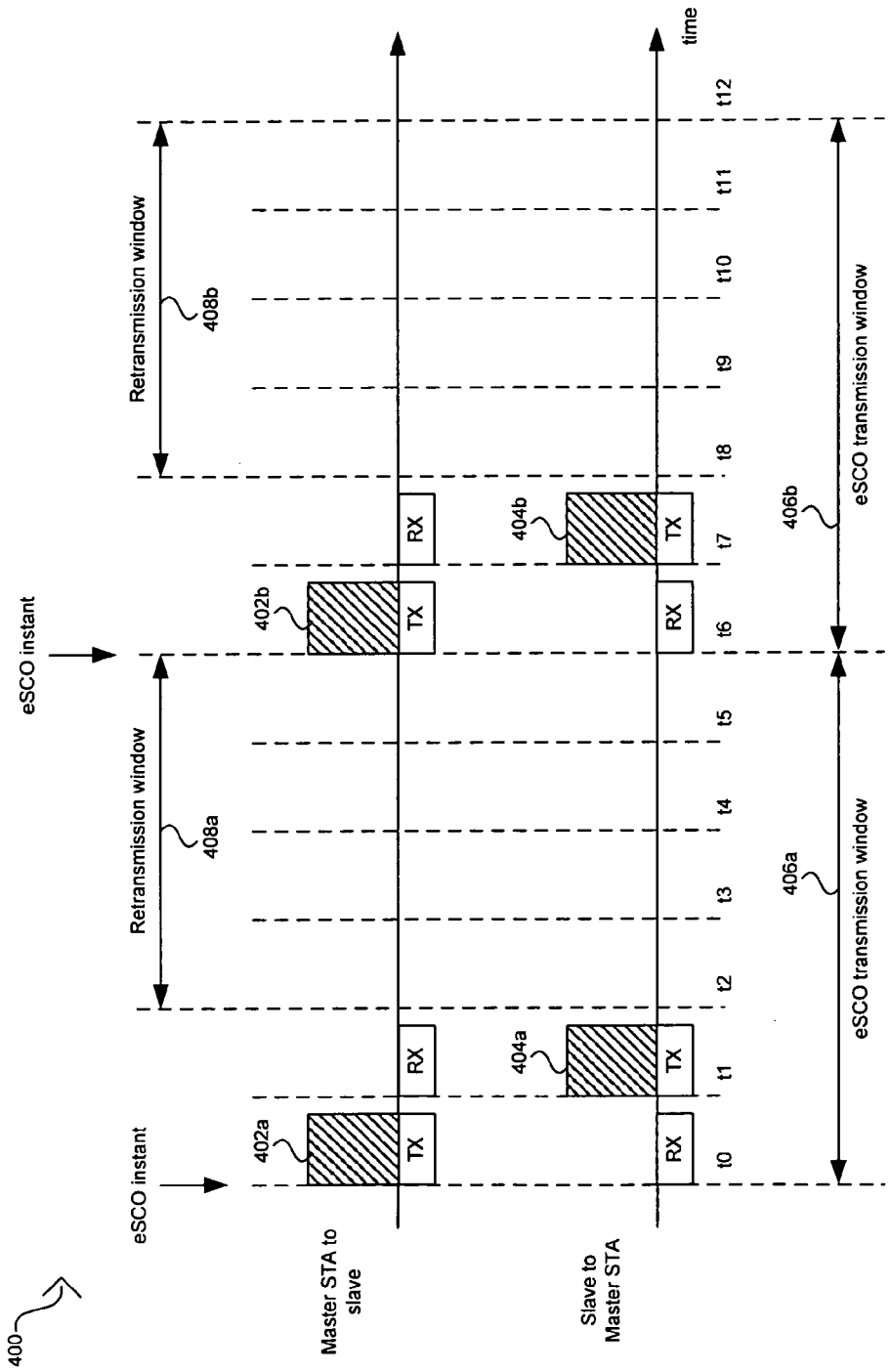
FIG. 4A is a timing diagram that illustrates an exemplary retransmission scheduling of EV3 Bluetooth eSCO packets for a VoWLAN and Bluetooth usage model, in accordance with an embodiment of the invention.

FIG. 4A is a timing diagram that illustrates an exemplary retransmission scheduling of EV3 Bluetooth eSCO packets for a VoWLAN and Bluetooth usage model, in accordance with an embodiment of the invention. Referring to FIG. 4A, there is shown a Bluetooth transmission diagram 400 that corresponds to an instance when Bluetooth radio and WLAN radio supporting voice-over-WLAN (VoWLAN) communication are operating collaboratively and are collocated in a single WLAN/BT chip radio device in a mobile device, such as a mobile phone, for example. This usage model may be implemented when, for example, a Bluetooth-enabled headset communicates with the mobile device via the Bluetooth protocol and the mobile device simultaneously communicates with an access point via the WLAN protocol.

The Bluetooth communication may occur via an extended synchronous connection-oriented (eSCO) logical transport, for example. The eSCO logical transport is a symmetric or asymmetric, point-to-point link between the master and a specific slave. The eSCO reserves slots on the physical channel and may therefore be considered as a circuit-switched connection between the master and the slave. The eSCO links may offer a number of extensions over the standard SCO links, in that they support a more flexible combination of packet types and selectable data contents in the packets and selectable slot periods, allowing a range of synchronous bit rates to be supported. An eSCO links may also offer limited retransmission of packets, unlike SCO links where there is no retransmission. If retransmissions are required, they may take place in the slots that follow the reserved slots, otherwise the slots may be used for other traffic, for example.

An eSCO packet may comprise a cyclic redundancy check (CRC) code and retransmission may be applied when no acknowledgement of proper reception is received in the reserved timeslot. The eSCO packet may be utilized for 64 kb/s audio transmission, transparent data transmission at 64 kbs/s, and/or for other transmission rates, for example. The Bluetooth protocol specifies an EV3 packet as one implementation of an eSCO packet that may comprise between 1 and 30 information bytes and a 16-bit CRC code.

The packets 402a and 402b, in time slots t0 and t6 in FIG. 4A respectively, may be EV3 packets transmitted from a master station (STA) to a slave device. In this exemplary usage model, the master station may correspond to the mobile device and the slave device may correspond to the Bluetooth-enabled headset, for example. Similarly, packets 404a and 404b, in time slots t1 and t7 respectively, may be EV3 packets transmitted from the slave device to the master station. The eSCO transmission windows 406a and 406b may correspond to intervals of time for the transmission of eSCO packets such as EV3 packets, for example. The time interval of the eSCO transmission window 406a comprises time slots t0 through t5. The time interval of the eSCO transmission window 406b comprises time slots t6 and through t11.

The retransmission windows 408a and 408b may correspond to intervals of time that may be utilized when the intended communication did not occur correctly in the reserved timeslots. For example, during the retransmission window 408a an acknowledgment of receipt of packet 402a by the Bluetooth-enabled headset may be received at the mobile device. Similarly, during the retransmission window 408b an acknowledgment of receipt of packet 402b by the Bluetooth-enabled headset may be received at the mobile device. The time interval of the retransmission window 408a comprises time slots t2 through t5 while the time interval of the retransmission window 408b comprises time slots t8 and through t11, for example.

When an eSCO packet transmission may not occur in the reserved eSCO time slots, such as time slot t0 for the master STA without causing a collision with the TXPO interval, the PTS 308 in FIG. 3 may reschedule transmission of the eSCO packet within the retransmission window 408a, for example. The VoWLAN communication in this exemplary usage model may support quality-of-service (QoS) features such as transmission opportunities (TXOPs) that provide an interval of time during which a WLAN station may transmit a WLAN packet. The WLAN protocol may also support QoS in AV, video, and VoIP applications, for example. In this regard, the PTS 308 may utilize Bluetooth retransmission information and/or the WLAN TXOP information to synchronize and/or schedule an eSCO packet retransmission when necessary. The PTS 308 may be adapted to determine the retransmission schedule based on current priority levels for WLAN and Bluetooth transmission.

Referring to FIG. 4A, during the eSCO transmission window 406a, when the slave device does not acknowledge reception of the packet 402a during the retransmission window 406a, the PTS 308 may schedule retransmission of the packet 402a in a subsequent eSCO transmission window such as the eSCO transmission window 406b. In this regard, the time interval of the eSCO transmission window 406b may be determined based on the WLAN transmission opportunities. Moreover, the PTS 308 may coordinate the eSCO transmission window 406b and the transmission opportunities based on the global clock 302. During the eSCO transmission window 406b, the packet 402a may be retransmitted to the slave device as the packet 402b, for example.

Figure 4B:
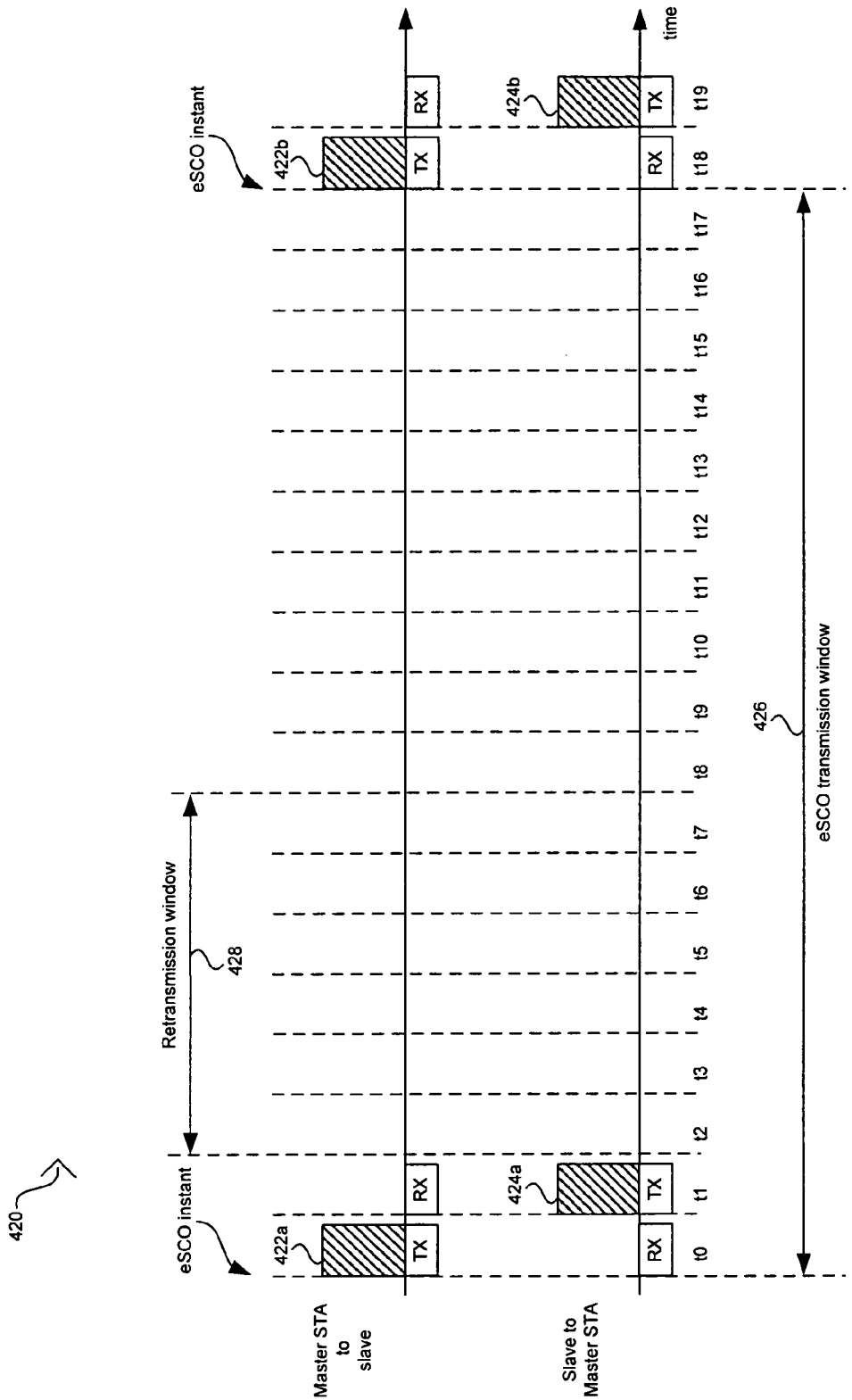
FIG. 4B is a timing diagram that illustrates an exemplary retransmission scheduling of 3-EV3 Bluetooth eSCO packets a VoWLAN and Bluetooth usage model, in accordance with an embodiment of the invention.

FIG. 4B is a timing diagram that illustrates an exemplary retransmission scheduling of 3-EV3 Bluetooth eSCO packets for a VoWLAN and Bluetooth usage model, in accordance with an embodiment of the invention. Referring to FIG. 4B, there is shown a Bluetooth transmission diagram 420 that corresponds to an instance when Bluetooth radio and WLAN radio supporting VoWLAN communication are operating collaboratively and are collocated in a single WLAN/BT chip radio device in a mobile device, such as a mobile phone, for example. The Bluetooth communication may occur via an eSCO logical transport utilizing 3EV3 packets, for example. The 3-EV3 packet may be similar to the EV3 packet except that the payload is modulated using 8DPSK. The 3-EV3 packet type may be used for supporting 64 kbps BT voice traffic, similar to the EV3 and HV3 packet types. The 3-EV3 packet type may have between 1 and 90 information bytes plus a 16-bit CRC code. The bytes may not be protected by FEC. A 3-EV3 packet may cover up to a single time slot. There is no payload header present in a 3-EV3 packet.

The packets 422a and 422b, in time slots t0 and t18 in FIG. 4B respectively, may be 3-EV3 packets transmitted from a master station (STA) to a slave device. Similarly, packets 424a and 424b, in time slots t1 and t19 respectively, may be 3-EV3 packets transmitted from the slave device to the master station. The eSCO transmission window 426 may correspond to a time interval for the transmission of eSCO packets such as 3-EV3 packets, for example. The time interval of the eSCO transmission window 426 comprises time slots t0 through t17. The retransmission windows 428 may correspond to a time interval that may be utilized when the intended communication did not occur correctly in the reserved timeslots. For example, during the retransmission window 428 an acknowledgment of receipt of packet 422a by the Bluetooth-enabled headset may be received at the mobile device. The time interval of the retransmission window 428 comprises time slots t2 through t8. In this regard, the retransmission window 428 may be configured to be longer or shorter than the exemplary embodiment described in FIG. 4B When an eSCO packet transmission may not occur in the reserved eSCO time slots, such as time slot t0 for the master STA without causing a collision with the TXPO interval, the PTS 308 in FIG. 3 may reschedule transmission of the eSCO packet within the retransmission window 428, for example. In this regard, the PTS 308 may utilize Bluetooth retransmission information and/or the WLAN TXOP information to synchronize and/or schedule an eSCO packet retransmission when necessary. The PTS 308 may enable determining the retransmission schedule based on current priority levels for WLAN and Bluetooth transmission.

Figure 5:
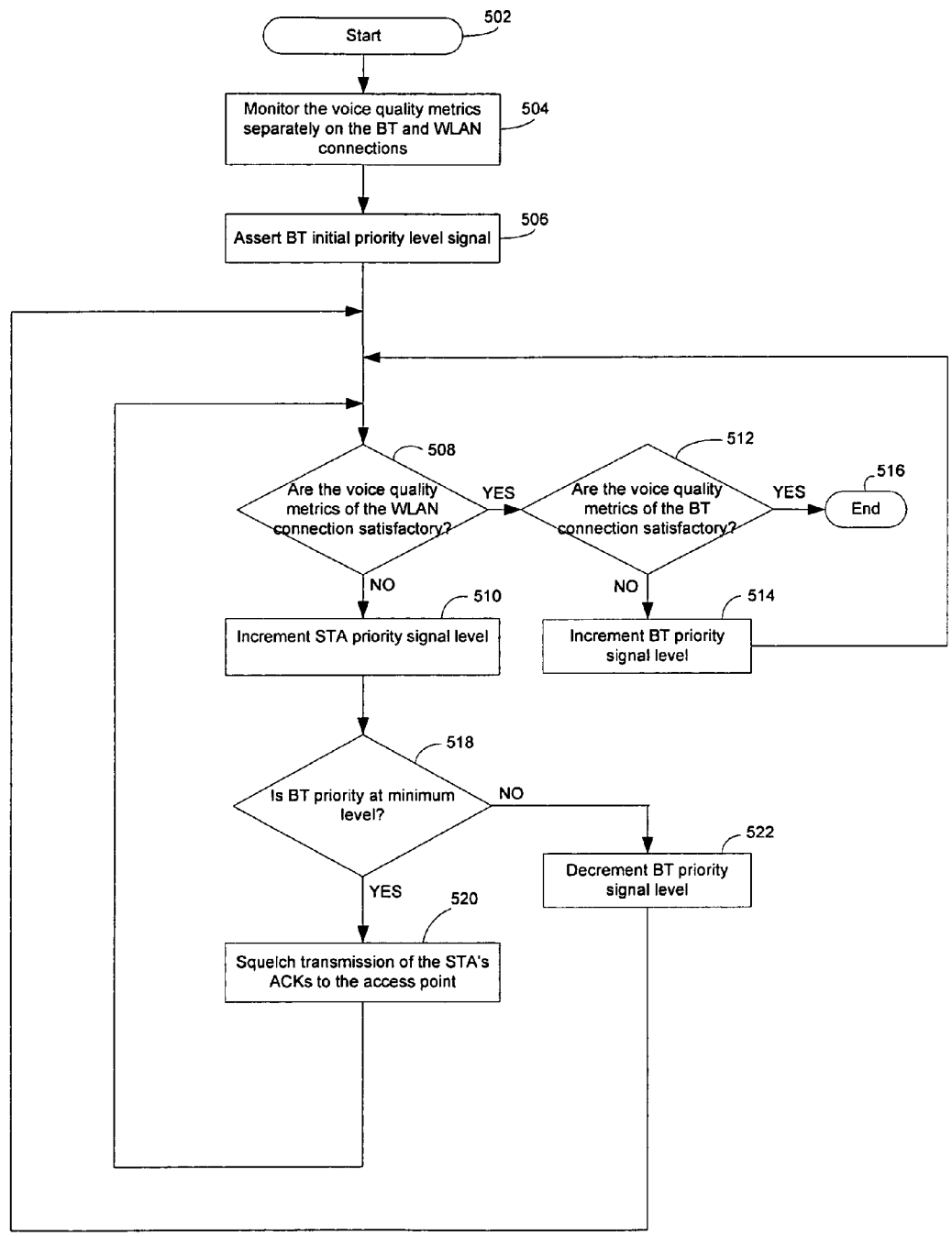
FIG. 5 is a flowchart illustrating exemplary steps for enabling simultaneous VoWLAN and Bluetooth audio in small form factor handheld devices, in accordance with an embodiment of the invention.

FIG. 5 is a flowchart illustrating exemplary steps for enabling simultaneous VoWLAN and Bluetooth audio in small form factor handheld devices, in accordance with an embodiment of the invention. Referring to FIG. 5, exemplary steps may begin at step 502. In step 504, the voice quality metrics of at least one of the Bluetooth connection and the WLAN connection may be measured separately. In step 506, the initial BT priority signal may be asserted. In step 508, it may be determined whether the voice quality metrics of the WLAN connection are satisfactory. If the voice quality metrics of the WLAN connection are satisfactory, control passes to step 512. In step it may be determined whether the voice quality metrics of the BT connection are satisfactory. If the voice quality metrics of the BT connection are satisfactory, control passes to end step 516. If the voice quality metrics of the BT connection are not satisfactory, control passes to step 514. In step 514, the BT priority signal level may be incremented. Control then returns to step 508. If the voice quality metrics of the WLAN connection are not satisfactory, control passes to step 510. In step 510, the STA's, for example, STA 110*a* or STA 110*b* priority signal level may be incremented. Control then passes to step 518.

In step 518, it may be determined whether the BT priority is at a minimum level. If the BT priority is at a minimum level, control passes to step 520. In step 520, the transmission of acknowledgement (ACK) packets from the STA 110*a* to the AP 112*a* may be squelched. Control then returns to step 508. If the BT priority is not at a minimum level, control passes to step 522. In step 522, the BT priority signal level may be decremented. Control then returns to step 508.

In an embodiment of the invention, different distances between the WLAN and BT devices may cause the transmission rate to change and the antenna isolation for the dual antenna case may be compromised by BT transmit power control. The WLAN bandwidth requirements may be a function of the codec, packetization delay and datagram spacing. The WLAN bandwidth requirement may be 87.2 kbps, for example, but for certain codecs like G.723.1, the WLAN bandwidth requirement may be 20.8 kbps, for example. In the station to access point direction, if there is a collision of a packet with a BT frame, there may not be a time-multiplexing penalty for sharing the channel.

Due to lower bit rate requirements the 8 kbps VoIP codecs such as G729 may have less collisions requiring collaborative coexistence arbitration than G711, a 64 kbps VoIP codec. When there are collisions between packets and BT frames, the more highly compressed codecs may exhibit a more severe penalty to the voice quality. In an embodiment of the invention, a VoIP codec may be negotiated based on operating in either voice over WLAN (VoWLAN) and BT headset mode or only VoWLAN mode.

In accordance with an embodiment of the invention, a system for providing wireless communication may comprise a single integrated circuit (IC), for example, a single chip WLAN/BT radio device 204 (FIG. 2) that handles communication via at least a Bluetooth (BT) connection and a Wireless Local Area Network (WLAN) connection by controlling transmission of acknowledgement signals based on a measured voice quality of at least one of: the BT connection and the WLAN connection. The single chip WLAN/BT radio device 204 may be adapted to control the transmission of the acknowledgement signals communicated from at least one of: the mobile station, for example, mobile phone 132 (FIG. 1D) to an access point, for example, AP 130 or from the access point 130 to the mobile phone 132. The AP 130 may be enabled to lower bound the rate of packets carrying voice traffic to the station or mobile phone 132. The packets being received by the mobile phone 132 along with the SIFS interval and the corresponding ACK may be constrained to be within a specific interval, for example, 2.5 ms.

The single chip WLAN/BT radio device 204 may be adapted to assert a BT priority signal if data to be transmitted comprised high quality voice (HV3) data. The single chip WLAN/BT radio device 204 may be adapted to control the transmission of the acknowledgement signals by raising a priority of an asserted WLAN priority signal higher than a priority of the asserted BT priority signal. The single chip WLAN/BT radio device 204 may be adapted to transmit the voice data via high quality voice (HV3) frames over the BT connection based on the asserted WLAN priority signal. The single chip WLAN/BT radio device 204 may be adapted to modify a WLAN fragmentation threshold utilized by the WLAN connection based on a WLAN modulation rate and a high quality voice (HV3) frame duration utilized by the BT connection. The single chip WLAN/BT radio device 204 may be adapted to modify bandwidth of at least one of: the BT connection and the WLAN connection based on the measured voice quality.

The single chip WLAN/BT radio device 204 may be adapted to control transmission of the acknowledgement signals based on a determined end-to-end delay of one or both of the BT connection and the WLAN connection. The end-to-end delay may be the sum of various delays, such as packetization delay, transport delay, jitter buffer delay, and propagation delay. The jitter buffer delay may be a fixed delay introduced by the receiver to hold one or more datagrams to damp variations in arrival times. The propagation delay may be the time to travel across the network.

The single chip WLAN/BT radio device 204 may be adapted to measure the voice quality of an Internet Protocol (IP) connection. The single chip WLAN/BT radio device 204 may be adapted to reduce a priority of an asserted BT priority signal if data to be transmitted comprised at least one of: extended voice (EV3) data and 3EV3 data. The EV3 packets may be utilized on the synchronous eSCO logical transport. The EV3 packets may include a cyclic redundancy check (CRC) and retransmission may be applied if no acknowledgement of proper reception is received within the retransmission window. The EV3 packet may have between 1 and 30 information bytes and a 16-bit CRC code, for example. The EV3 packet may cover up to a single time slot with no payload header present. The payload length may be set during the link management protocol (LMP) eSCO setup and may remain fixed until the link is removed or renegotiated. The BT frame carrying voice data on either transmit or receive side may be 1.25 ms long, for example, which leaves 11.25 ms–1.25 ms=10 ms, for example, for WLAN traffic. In 3EV3, the modulation rate may be lower bounded to a lower threshold. In HV3 and EV3, the station's transmit modulation rate may be lower bounded to 36 Mbps, for example. In 3EV3, the station's transmit modulation rate may be lower bounded to 11 Mbps, for example. The lower modulation rates supported in 3EV3 may increase the range of WLAN devices that may be supported as the SNR decreases due to higher distances or higher path losses.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a single integrated circuit (IC) capable of handling communication for a personal area network (PAN) connection and a Wireless Local Area Network (WLAN) connection:
      determining quality metrics for said PAN connection;
      determining quality metrics for said WLAN connection;
      in response to determining that said quality metrics for said WLAN connection are satisfactory, refraining from squelching transmission of acknowledgement signals corresponding to packets of said WLAN connection irrespective of whether the quality metrics for the PAN connection are unsatisfactory, and incrementing a priority level associated with the PAN connection when said quality metrics for said PAN connection are unsatisfactory; and
      in response to determining that the quality metrics for the WLAN connection are unsatisfactory, when the priority level associated with the PAN connection reaches a threshold level, squelching the transmission of the acknowledgement signals corresponding to the packets of the WLAN connection, otherwise decrementing the priority level associated with the PAN connection.

2. The method according to claim 1, wherein said acknowledgement signals are communicated from a mobile station to an access point.

3. The method according to claim 1, further comprising in response to determining that data to be transmitted comprises high quality voice (HV3) data, asserting a PAN priority signal.

4. The method according to claim 3, further comprising controlling said transmission of said acknowledgement signals by raising a priority of an asserted WLAN priority signal higher than a priority of said asserted PAN priority signal.

5. The method according to claim 4, further comprising transmitting voice data via high quality voice (HV3) frames over said PAN connection based at least in part on said asserted WLAN priority signal.

6. The method according to claim 1, further comprising modifying a WLAN fragmentation threshold utilized by said WLAN connection based at least in part on a WLAN modulation rate and a high quality voice (HV3) frame duration utilized by said PAN connection.

7. The method according to claim 1, further comprising modifying bandwidth of at least one of: said PAN connection or said WLAN connection based at least in part on said quality metrics of said WLAN connection, said quality metrics of said PAN connection, or both.

8. The method according to claim 1, comprising controlling said transmission of said acknowledgement signals based at least in part on a determined end-to-end delay of said PAN connection, said WLAN connection, or both.

9. The method according to claim 1, comprising wherein said quality metrics of said PAN connection and said WLAN connection correspond to transmitted via an Internet Protocol (IP) connection.

10. The method according to claim 1, further comprising in response to determining that data to be transmitted comprises at least one of: extended voice (EV3) data or 3EV3 data, reducing a priority of an asserted PAN priority signal.

11. A non-transitory machine-readable storage medium having stored thereon, a computer program having at least one code section, the at least one code section being executable by a machine for causing the machine to at least:
   determine quality metrics for a Personal Area Network (PAN) connection;
   determine quality metrics for a Wireless Local Area Network (WLAN) connection, said PAN connection and said WLAN connection being in coexistent operation;
   in response to determining that said quality metrics for said WLAN connection are satisfactory, refraining from squelching transmission of acknowledgement signals for received packets of said WLAN connection irrespective of whether the quality metrics for the PAN connection are unsatisfactory, and incrementing a priority level associated with the PAN connection when said quality metrics for said PAN connection are unsatisfactory; and
   in response to determining that the quality metrics for the WLAN connection are unsatisfactory, when the priority level associated with the PAN connection reaches a threshold level, squelching the transmission of the acknowledgement signals corresponding to the packets of the WLAN connection, otherwise decrementing the priority level associated with the PAN connection.

12. The non-transitory machine-readable storage medium according to claim 11, wherein said at least one code section comprises code for controlling transmission of said acknowledgement signals communicated from a mobile station to an access point.

13. The non-transitory machine-readable storage medium according to claim 11, further comprising code for, in response to determining that data to be transmitted comprises high quality voice (HV3) data, asserting a PAN priority signal.

14. The non-transitory machine-readable storage medium according to claim 13, further comprising code for controlling said transmission of said acknowledgement signals by raising a priority of an asserted WLAN priority signal higher than a priority of said asserted PAN priority signal.

15. The non-transitory machine-readable storage medium according to claim 14, further comprising code for transmitting voice data via high quality voice (HV3) frames over said PAN connection based at least in part on said asserted WLAN priority signal.

16. The non-transitory machine-readable storage medium according to claim 11, further comprising code for modifying a WLAN fragmentation threshold utilized by said WLAN connection based at least in part on a WLAN modulation rate and a high quality voice (HV3) frame duration utilized by said PAN connection.

17. The non-transitory machine-readable storage medium according to claim 11, further comprising code for modifying bandwidth of at least one of: said PAN connection or said WLAN connection based at least in part on said quality metrics of said WLAN connection, said quality metrics of said PAN connection, or both.

18. The non-transitory machine-readable storage medium according to claim 11, wherein said at least one code section comprises code for controlling transmission of said acknowledgement signals for the received packets based at least in part on a determined end-to-end delay of said PAN connection, said WLAN connection, or both.

19. The non-transitory machine-readable storage medium according to claim 11, wherein said quality metrics of said PAN connection and said WLAN connection correspond to voice transmitted via an Internet Protocol (IP) connection.

20. The non-transitory machine-readable storage medium according to claim 11, further comprising code for, in response to determining that data to be transmitted comprises at least one of: extended voice (EV3) data or 3EV3 data, reducing a priority of an asserted PAN priority signal.

21. A system, comprising:
one or more circuits within a single integrated circuit (IC) that is capable of handling communication for a Personal Area Network (PAN) connection and a Wireless Local Area Network (WLAN) connection, said one or more circuits being capable of:
determining quality metrics for said PAN connection;
determining quality metrics for said WLAN connection; and
in response to determining that said quality metrics for said WLAN connection are satisfactory, refraining from squelching transmission of acknowledgement signals for received packets of said WLAN connection irrespective of whether the quality metrics for the PAN connection are unsatisfactory, and incrementing a priority level associated with the PAN connection when said quality metrics for said PAN connection are unsatisfactory; and
in response to determining that the quality metrics for the WLAN connection are unsatisfactory, when the priority level associated with the PAN connection reaches a threshold level, squelching the transmission of the acknowledgement signals corresponding to the packets of the WLAN connection, otherwise decrementing the priority level associated with the PAN connection.

22. The system according to claim 21, wherein said acknowledgement signals are communicated from a mobile station to an access point.

23. The system according to claim 21, wherein said one or more circuits are capable of asserting a PAN priority signal in response to determining that data to be transmitted comprises high quality voice (HV3) data.

24. The system according to claim 23, wherein said one or more circuits are capable of controlling said transmission of said acknowledgement signals by raising a priority of an asserted WLAN priority signal higher than a priority of said asserted PAN priority signal.

25. The system according to claim 24, wherein said one or more circuits are capable of transmitting voice data via high quality voice (HV3) frames over said PAN connection based at least in part on said asserted WLAN priority signal.

26. The system according to claim 21, wherein said one or more circuits are capable of modifying a WLAN fragmentation threshold utilized by said WLAN connection based at least in part on a WLAN modulation rate and a high quality voice (HV3) frame duration utilized by said PAN connection.

27. The system according to claim 21, wherein said one or more circuits are capable of modifying bandwidth of at least one of: said PAN connection or said WLAN connection based at least in part on said quality metrics of said WLAN connection, said quality metrics of said PAN connection, or both.

28. The system according to claim 21, wherein said one or more circuits are capable of controlling said transmission of said acknowledgement signals for the received packets based at least in part on a determined end-to-end delay of said PAN connection, said WLAN connection, or both.

29. The system according to claim 21, wherein said quality metrics of said PAN connection and said WLAN connection correspond to voice transmitted via an Internet Protocol (IP) connection.

30. The system according to claim 21, wherein said one or more circuits are capable of reducing a priority of an asserted PAN priority signal in response to determining that data to be transmitted comprises at least one of: extended voice (EV3) data or 3EV3 data.

* * * * *